July 17, 1956 — C. G. HUNER — Re. 24,795
AUTOMATIC DOOR CONTROL FOR MILKING BARNS
Filed Aug. 24, 1954 — 2 Sheets-Sheet 1

INVENTOR
Carl G. Huner

July 17, 1956  C. G. HUNER  2,755,080
AUTOMATIC DOOR CONTROL FOR MILKING BARNS
Filed Aug. 24, 1954  2 Sheets-Sheet 2

INVENTOR
Carl G. Huner

United States Patent Office 2,755,080
Patented July 17, 1956

2,755,080

AUTOMATIC DOOR CONTROL FOR MILKING BARNS

Carl G. Huner, Ridgeville Township, Henry County, Ohio

Application August 24, 1954, Serial No. 451,761

9 Claims. (Cl. 268—50)

This invention relates to improvements in automatic door controls for milking barns and more particularly to the controls of the entrance door of milking barns arranged and provided for producing grade A milk which are actuated by the vacuum line for milking machines.

In producing grade A milk three stalls are permitted in the dairy barn and one cow being permitted to enter at a time for each milking stall, the next cow not being permitted to enter until the first cow has been milked and left the milking barn. It will readily be noted that considerable time is required to operate the doors unless the doors operate automatically.

Several types of door operating devices are being used at the present time. Electric operation has not proven satisfactory because of complicated mechanisms including reversing switches and complicated wiring, which are expensive and frequently get out of order.

Compressed air operated door mechanisms require a compressor and driving means, a tank, along with other control mechanisms. In either case, whether electrically or compressed air operated, another complete installation is necessary for operating the dairy barn door.

In the present type of vacuum operated door control it is necessary for the operator to operate a valve to open the door and again to operate a valve to close the door. A door control of this type is disclosed in Patent 2,671,428. In this type of control the operator has to wait until after the cow has entered the dairy barn before he can operate the valve to close the door. This requires considerable time and furthermore does not give the operator the proper freedom of operation. While one cow is entering one or more cows are being milked by vacuum machines. It is of utmost importance that the milking machines are turned off and removed at the proper time. Improper operation and timing of the milking machines results in poor health and certain types of diseases of the cow. The present type of vacuum actuated door controls do not give the operator the necessary freedom of operation because after operating the valve to open the entrance door the operator must wait until the cow has entered to operate the valve to close the door. During this time the operator cannot check the cow or cows that are being milked. Hence the present type of door controls have not proven satisfactory.

My improved vacuum operated automatic door control requires a minimum of equipment with no extra wiring, switches, or compressed air mechanism, being operated by the mechanical milker vacuum line. It is merely connected in the vacuum line to the milking machines through conduits or tubing to a three way valve, vacuum cylinder or vacuum jack and provided with mechanism suitable for operating the three way valve. My improved device further provides for the necessary freedom of operation of the operator. In my novel automatic door operating device the operator merely operates a lever or suitable means, the door then opens, allows the cow to enter and automatically closes after the cow enters. It will readily be seen that my novel arrangement provides the necessary freedom of the operator for properly caring for the milking machine and the cow or cows that are being milked.

One of the objects of my invention is to provide a door operating device that requires a minimum of extra equipment.

Another object of my invention is to provide a door operating means for dairy barns that is completely automatic after the operator provides for the opening of the door.

Another object of my invention is to provide a door operating mechanism that provides the maximum amount of freedom for the operator.

Another object of my invention is to provide an automatic door operating mechanism that utilizes the vacuum source used by the mechanical milking machine for its source of power.

Another object of my invention is to provide an automatic door operating mechanism that is operable from different stations.

Another object of my invention is to provide an automatic door operating mechanism that requires a minimum of upkeep.

Another object of my invention is to provide an automatic door operating device for dairy barns that is simple, durable, easy to install, convenient to operate and economical in construction and operation.

Further objects of my invention will appear more fully hereinafter.

My invention consists substantially in the construction, combination and relative location of the various parts as will be more fully described in the following specification, claimed in the claims and shown in the accompanying drawings.

Referring to the drawings.

Referring now in more detail to the drawings the entrance door 1 is supported by rollers 2 operating on a slightly inclined track 3, the door being hung from the rollers 2 by brackets 4. The dotted lines indicate the position of the door 1 when it is open.

Figure 2:
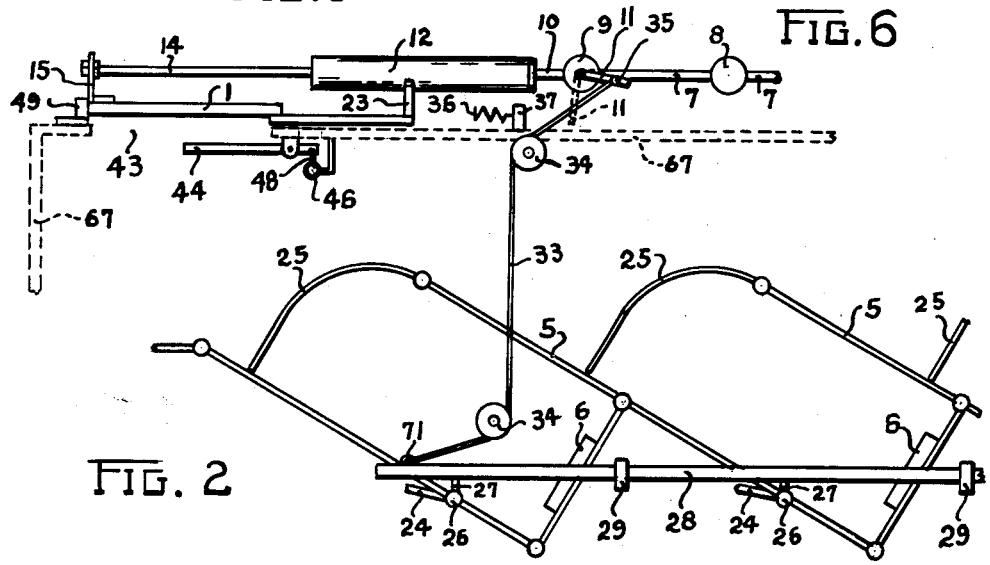
Fig. 2 is a fragmentary top plan view of the arrangement shown in Fig. 1 and also showing several stalls and a wall of the dairy barn.

Several stalls 5, located within the milking barn, are shown in Fig. 2. A portion of the dairy barn wall is indicated at 67. Usually three milking stalls are provided, one for each cow to be milked at a time. Each stall is provided with a feed trough 6.

A vacuum line 7 is connected to the vacuum line leading to the milking machine or directly to the vacuum pump (not shown). A control valve 8 is located at any convenient place in the vacuum line 7 which leads to the three-way valve 9 which is provided with an operating lever 11. A vacuum line 10 connects the three-way valve 9 and the vacuum jack 12 which is supported by one or more brackets 13. A piston rod is secured to the door bracket 15.

The vacuum jack consists of a length of tubing 16 closed at one end by means of an annular plate 17 welded to the tubing 16. The piston comprises a leather cup member 18 with the bottom sandwiched between two washers 19 and 20, with assembly secured together by nuts 21 and 22 on the piston rod 14. The vacuum line is secured to the annular plate 17. The door 1 is provided with a valve operating bracket 23.

The stalls 5 are provided with an operating arm 24 which is used to operate the stall gate 25 and is secured to the vertical rod 26. The mechanism for operating the stall gate 25 is well known in the art and is not shown in the drawings for the sake of simplicity and clearness. The gate operating arm 24 is turned counterclockwise in accordance with Fig. 2 to open the stall gate 25. When the gate operating arm is turned the vertical rod 26 turns thereby turning the arm 27. A sliding bar is slidably held by the brackets 29. The sliding bar 28 is provided with a downwardly extending hinged arm 30 for each stall. Stops 31 secured to the sliding bar 28 permit the hinged arms 30 to turn only in one direction. An eyelet 32 is secured to the sliding bar 28. A rope or chain 33 secured to the eyelet 32 passes around suitable pulleys 34 and is secured to the valve operating arm at point 35.

Figure 5:
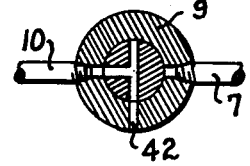
Fig. 5 is an enlarged sectional view of the three-way valve in the open position.
Figure 6:
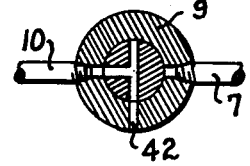
Fig. 6 is an enlarged sectional view of the three-way valve in the closed position.
Figure 3:
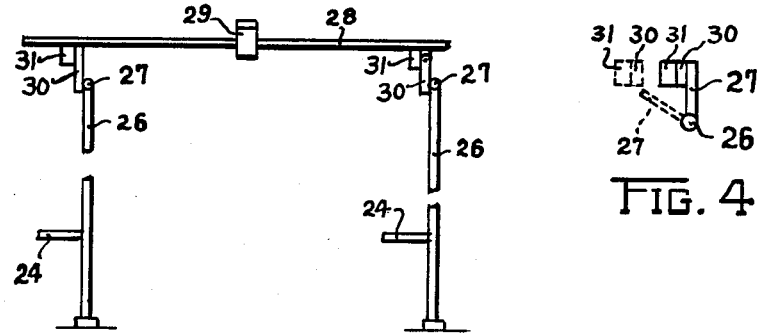
Fig. 3 is a fragmentary view showing part of the mechanism used to operate the three-way valve.
Figure 4:
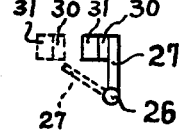
Fig. 4 is an enlarged fragmentary view of the valve operating mechanism shown in Fig. 3.
Figure 7:
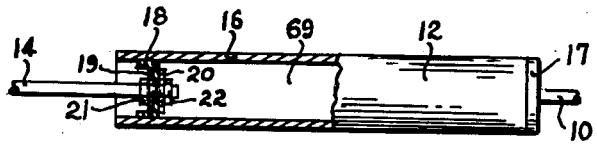
Fig. 7 is an enlarged view partially in section of the vacuum cylinder or vacuum jack.

When the operator desires to have a cow enter one of the stalls 5 he turns the gate operating arm 24 which causes the gate 25 to open and at the same time the vertical rod 26 turns thereby swinging the arm member 27. The arm member 27 engages the downwardly extending arm 30 and thereby moves the sliding bar 28 to the left. As the arm 27 continues to turn it frees itself from the hinged arm 30 as shown by the dotted position of the arm in Fig. 4. As the sliding bar 28 is moved to the left the rope 23 pulls or turns the operating lever 11 to the position shown by the dotted lever 11 in Fig. 2. The valve is then turned on or to the position shown in Fig. 5. The vacuum from the vacuum line 7 is then transmitted through the vacuum line 10 to the chamber 36 in the vacuum jack 12 thereby causing the piston and the piston rod 14 to move to the right. The piston rod 14 being secured to the door 1 by means of the door bracket 15 pulls the door to the right thus opening the door. As the door 1 opens very rapidly a spring 36 which is secured to the wall bracket 37 is provided to absorb the shock of the door 1. The door stop 38 limits the travel of the door when it opens. When the door reaches the open position as shown by the dotted door 1 in Fig. 1 the catch 39 engages the bracket 40 on the door 1 thereby locking the door in the open position. A tension spring 41 tends to hold the catch 39 down in position while the catch stop 42 limits the down position of the catch 39. As the door 1 opens it carries with it the operating bracket 23 which engages the valve operating arm 11 and closes it, that is it moves the operating arm 11 from the dotted position to the full position shown in Fig. 2. The three-way valve is then in the position shown in Fig. 6. Atmospheric pressure now enters the chamber 36 of the vacuum jack 12 through the port 42 of the valve 9.

The open door 1 now permits the cow to enter through the doorway 43. As the cow enters it pushes the trip arm 44 which pivots at point 45. As the trip arm pivots the short end of the trip arm 44 pulls the rope 48 which is secured thereto. The rope 48 passes through the eye 46 and over suitably arranged pulleys 47 and is secured to the catch 39. As the rope 48 is pulled by the trip arm 44 the door catch 39 rises and disengages the door bracket 40. The door 1 being mounted on a slightly inclined track 3 then moves to the left to the closed position due to gravity. The door stop 49 stops the door when it reaches the closed position. After the cow enters and passes through the doorway 43 she proceeds to the one of the stalls 5 which is open, being attracted by feed in the trough 6. The operator can then close the stall gate 25 at his convenience.

It will be noted that all the operator had to do during the above described procedure was to turn the stall gate control arm 24. During the rest of the time the operator is free to care for the cow or cows that are being milked by the mechanical milker. At the operator's convenience he closes the stall gate by turning the gate control arm 24 in a clockwise direction. At the same time the arm member 27 turns and pushes the downwardly extending hinged arm 30 to the right, passing beneath it and stopping in position for the next door opening procedure. It will be noted that each of the stalls 5 is provided with a gate control arm 24 so that the dairy barn door 1 can be opened by operating either of the gate control arms 24.

The valve 8 is provided to control the rate of speed of the opening of the door 1. If the door opens too rapidly the valve 8 is closed slightly while if it opens too slowly the valve 8 is opened until the desired rate of door opening is obtained. After the valve 8 is properly adjusted it will seldom have to be adjusted again.

Figures 8, 11:
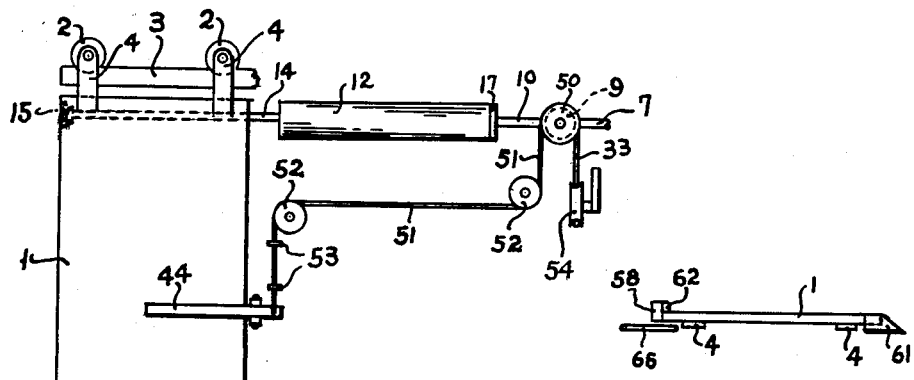
Fig. 8 is a fragmentary view of another embodiment of my novel invention.
Fig. 11 is a fragmentary top plan view of the modification shown in Fig. 10.

Fig. 8 discloses a modification of my novel automatic door control for dairy barns. The door 1 is shown in the closed position mounted by means of rollers 2 on the inclined track 3. The arrangement of the vacuum jack 12, piston rod 14 and door bracket 15 are substantially the same as described above. In this arrangement the trip arm 44 provides for the closing of the three-way valve. The three-way valve is provided with a wheel like member 50. A rope 51 is secured to the pulley 50 and passes around suitably arranged pulley members 52, through eye members 53 and then is secured to the short end of the pivot arm 44. The rope 33 is secured to the wheel like member 50, passes around the pulley 54 and then follows the same arrangement as shown in Fig. 2 where it is shown secured to the sliding bar 28. In this modification the opening of the stall gate 25 and the dairy barn door 1 is the same as described above. In this modification as shown in Fig. 8 the door 1 is held in the open position by the vacuum in the vacuum jack 12 until the cow enters the doorway 43 and pushes the trip arm 44 which in turn pulls the rope 52 and thereby shuts off the valve 9. Atmospheric pressure then enters and fills the vacuum chamber 36 through the port 42, thereby allowing gravity to close the door 1. This arrangement eliminates the use of catches for holding the door in the open position.

Figures 9, 10:
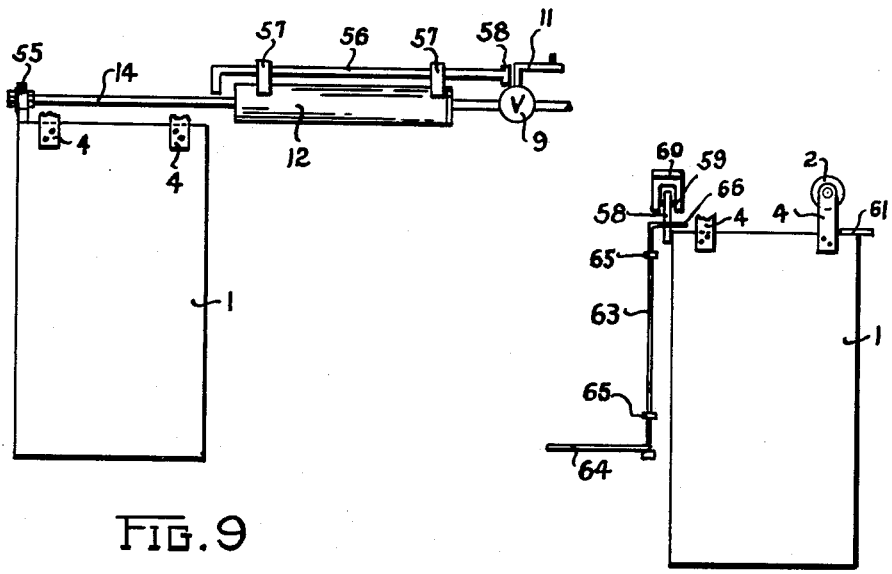
Fig. 9 is a fragmentary view showing another modification of my invention.
Fig. 10 is a fragmentary view showing another modification of my invention.

Fig. 9 discloses another method of closing the three-way valve 9. The operation and mechanism for opening the stall gate 25 and the door 1 being the same as described above regarding Figs. 1 and 2. In this arrangement the vacuum jack 12 is mounted slightly higher than the door 1 and the piston rod 14 is secured to the door bracket 55 which extends above the door. As the door opens the bracket 55 engages a sliding rod 56 mounted in the brackets 57. As the sliding rod 56 is pushed to the right the end of the rod 58 engages the operating lever 11 and thereby turns off the three-way valve 9. The locking arrangement for holding the door open shown in Figs. 1 and 2 may be used in connection with this arrangement the remainder of the operation then being the same as described above in connection with Figs. 1 and 2.

Figure 1:
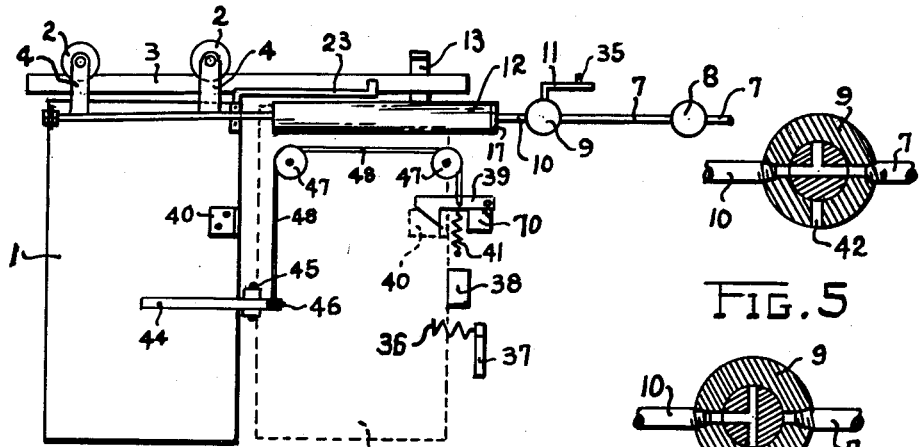
Fig. 1 is a front elevation showing one embodiment of my invention.

Fig. 10 discloses a modification in the mechanism for holding the door 1 open and shows the door in the open position. In this arrangement an arm member 58 is pivotably secured in the bracket 60 by means of the pin 59. The door 1 is provided with a tapered plate 61 at the forward upper edge. As the door opens the tapered plate 61 pushes the arm 58 back so the door will pass the arm 58. After the door 1 passes the arm 58 the arm drops in front of the door holding it open. The arm 58 may be provided with a stop portion 62 so that it will not swing past the door 1. A vertical rod rotably mounted in the brackets 65 is provided with an arm 64 extending into the doorway at its lower end and an arm 66 at its upper end. As the cow enters the doorway it pushes against the arm 64 causing the upper arm 66 to engage the pivoted arm 58 and push it back until it clears the door 1 thereby permitting gravity to close the door 1. This arrangement may be used in place of the catch arrangement for holding the door open as shown in Figs. 1 and or it may be used in connection with the arrangement shown in Fig. 8. Suitable spring members may be provided to hold the arm 64 in the proper position when it is not engaged by an entering cow.

From the above description it will be noted that only one three-way valve is required in novel arrangement and can be operated from any of the several stations. After the operator arranges to open the door the remainder of the operation becomes automatic, thereby, providing the desired freedom of operation of the operator. The closing of the stall gate door 25 can be performed at the operator's convenience as the dairy barn door is closed so that no more cows can enter and the cow that last entered remains in the stall because of the attraction of the feed in the feed trough 6. The extra equipment required for my novel automatic door operating device consists substantially of a three-way valve, vacuum lines, a vacuum jack, valve operating mechanism, door locking mechanism and door releasing mechanism.

While I have illustrated several preferred embodiments of my invention it will be apparent, from the above remarks, that various details of construction may be varied through a wide range without departing from the principles of the invention and I therefore do not wish to be limited to the particular forms shown and described, but desire to avail myself to such changes and alterations as fall within the purview of the following claims.

What I claim is:

1. An automatic dairy barn door operating device of the type described comprising a dairy barn door adapted to operate on an inclined track, a vacuum jack provided with a piston and piston rod, said piston rod adapted to be secured to said dairy barn door, a vacuum line extending from said vacuum jack to a vacuum source, a valve in said vacuum line adapted to be opened by a plurality of remote control means to provide a vacuum in said vacuum jack and a means operated by said barn door adapted to close said valve and allow atmospheric pressure enter said vacuum jack.

2. An automatic door control for dairy barns of the type described comprising a vacuum jack provided with a piston and piston rod, said piston rod adapted to be secured to the entrance door of a dairy barn, a vacuum line extending to said vacuum jack, a valve in said vacuum line adapted to be operated by the opening of a stall gate of either of a plurality of stanchions to provide a vacuum in said vacuum jack and thereby open said entrance door to permit a cow to enter and an automatic means adapted to close said door immediately after said cow has entered said dairy barn.

3. An automatic door control for dairy barns of the type described comprising a vacuum jack, a piston in said vacuum jack secured to a piston rod, said piston rod adapted to be secured to the entrance door of a dairy barn, a vacuum line leading from a vacuum source to said vacuum jack, a three-way valve located in said vacuum line, a manual valve operating means adapted to be operted by a stall gate control means of either of a plurality of stanchions to provide for the opening of said door and permit the entrance of a cow, a means adapted to retain said door in the open position and a door releasing means adapted to provide for the closing of said door immediately after said cow enters the dairy barn.

4. An automatic door control for dairy barns of the type described comprising a vacuum jack, a piston rod operated by said vacuum jack and adapted to be operably secured to the entrance door of a dairy barn, a vacuum line communicating said vacuum jack with a vacuum source, a valve in said vacuum line, a mechanism operable from a plurality of stations and adapted to open said valve and transmit the vacuum from said vacuum source to said vacuum jack and thereby open the entrance door of a dairy barn, a bracket secured to said door, said bracket adapted to close said valve while said door opens, a catch adapted to hold said door in the open position and a pivoted lever extending partially across the doorway of said dairy barn and adapted to provide for the releasing of said catch and thereby permit the closing of said door.

5. An automatic door control for dairy barns of the type described comprising a vacuum jack, a piston rod operated by said vacuum jack and adapted to be operably secured to the entrance door of a dairy barn, a vacuum line communicating said vacuum jack with a vacuum source, a valve in said vacuum line, a flexible line secured to the operating lever of said valve and operable from a plurality of stations adapted to open said valve and thereby transmit the vacuum provided by said vacuum line to said vacuum jack said vacuum actuating a piston secured to said piston rod whereby said door is opened, a bracket secured to said door, said bracket adapted to engage said operating lever and close said valve while said door opens, a port provided by said valve adapted to permit atmospheric pressure to enter the vacuum jack when said valve is closed, a catch adapted to hold said door in the open position and a pivoted lever adapted to be engaged by a cow entering said dairy barn and thereby adapted to operate a mechanism engaging said catch and lifting said catch to permit the closing of said door.

6. An automatic door control for dairy barns of the type described comprising a vacuum jack provided with a piston and a piston rod, said piston rod adapted to be secured to the entrance door of a dairy barn, a vacuum line extending to said vacuum jack, a valve in said vacuum line adapted to be operated by the opening of either one of a plurality of stall gates located in said dairy barn to provide a vacuum in said vacuum jack to operate the piston and thereby open said entrance door to permit a cow to enter said dairy barn and an arm member operably connected to said valve, said arm member adapted to be engaged by said cow entering said dairy barn and thereby closing said valve and permitting said door to close.

7. An automatic door control for dairy barns of the type described comprising a vacuum jack provided with a piston rod adapted to engage an entrance door of a dairy barn, a vacuum line communicating said vacuum jack with a vacuum source, a valve in said vacuum line, a mechanism operable by the opening of either one of a plurality of stall gates located in said dairy barn adapted to open said valve and transmit the vacuum from said vacuum source to said vacuum jack and thereby cause said piston rod to open said door to permit a cow to enter, an arm adapted to be engaged by said cow upon entering and thereby operating a suitable mechanism to close said valve, permit atmospheric pressure to enter said vacuum jack and thereby the closing of said door by gravity.

8. In a door operating mechanism for dairy barns, and in combination with a door mounted on an inclined track, a plurality of stanchions each provided with a stall gate, a vacuum operated door opening means adapted to be actuated by the opening of either of said stall gates, a door holding means adapted to hold said door in the open position and a door releasing means adapted to be actuated by the passage of a cow through the doorway and providing for the closing of said door by gravity.

9. In a door operating mechanism for dairy barns provided with a plurality of stalls and each stall provided with a gate and a gate operating means operated by a gate operating lever and in combination with an entrance door hung on an inclined track, a vacuum cylinder open at one end, a piston operating in said cylinder and having a piston rod extending through the open end of said cylinder and connected with said door, a port at the open end of said cylinder, a vacuum line leading from said port to a three-way valve, a second vacuum line communicating said three-way valve with a vacuum source, a control valve in said second vacuum line, a control arm adapted to operate said three-way valve, a flexible line extending from said control arm to a bar adapted to open said three-way valve and actuated by either one of said gate opening levers whereby the vacuum from said vacuum source is transmitted to said vacuum cylinder thereby operating said piston and causing said door to open, a catch adapted to hold the door when it reaches the open position, a door releasing means adapted to be actuated by a cow entering the dairy barn whereby said catch is released and thereby permit gravity to close said door hung on said inclined track.

References Cited in the file of this patent

UNITED STATES PATENTS

| | | |
|---|---|---|
| 464,597 | Webster | Dec. 8, 1891 |
| 609,987 | Ellithorpe | Aug. 30, 1898 |
| 1,216,345 | Mirau | Feb. 20, 1917 |
| 1,323,529 | Haskell et al. | Dec. 2, 1919 |
| 1,476,510 | Haskell | Dec. 4, 1923 |
| 1,825,128 | Rowntree | Sept. 29, 1931 |
| 2,057,912 | O'Hara | Oct. 20, 1936 |
| 2,633,353 | Meek | Mar. 31, 1953 |
| 2,634,124 | Davis | Apr. 7, 1953 |
| 2,671,428 | Hill | Mar. 9, 1954 |